(12) United States Patent
Radchenko et al.

(10) Patent No.: US 10,855,118 B2
(45) Date of Patent: Dec. 1, 2020

(54) ELECTRIC SHIELDING STRUCTURES

(71) Applicant: Apple Inc., Cupertino, CA (US)

(72) Inventors: Andro Radchenko, San Jose, CA (US); Vaneet Pathak, Los Altos, CA (US); Martin Schauer, Fremont, CA (US); Cheung-Wei Lam, San Jose, CA (US); Rahul A. Sabnani, Colma, CA (US)

(73) Assignee: Apple Inc., Cupertino, CA (US)

( * ) Notice: Subject to any disclaimer, the term of this patent is extended or adjusted under 35 U.S.C. 154(b) by 14 days.

(21) Appl. No.: 16/145,503

(22) Filed: Sep. 28, 2018

(65) Prior Publication Data

US 2019/0393733 A1 Dec. 26, 2019

Related U.S. Application Data

(60) Provisional application No. 62/688,547, filed on Jun. 22, 2018.

(51) Int. Cl.
*H02J 7/00* (2006.01)
*H02J 50/70* (2016.01)
(Continued)

(52) U.S. Cl.
CPC .......... *H02J 50/70* (2016.02); *H01F 27/2885* (2013.01); *H01F 27/362* (2013.01); *H02J 50/12* (2016.02)

(58) Field of Classification Search
USPC ................................ 320/104, 107, 108, 110
See application file for complete search history.

(56) References Cited

U.S. PATENT DOCUMENTS

| | | | |
|---|---|---|---|
| 2015/0246614 A1* | 9/2015 | Dames ................ | H05K 9/0075 191/10 |
| 2016/0012967 A1* | 1/2016 | Kurs ...................... | H02J 50/12 307/104 |

(Continued)

FOREIGN PATENT DOCUMENTS

| | | |
|---|---|---|
| CN | 103296709 A | 9/2013 |
| CN | 104065174 A | 9/2014 |

(Continued)

OTHER PUBLICATIONS

Notice of Allowance and Notice to Grant a Patent for Utility Model dated Nov. 18, 2019 in Chinese Patent Application No. 201920707721. 4. 6 pages, includes English translation of allowed claims.

(Continued)

*Primary Examiner* — Brian Ngo
(74) *Attorney, Agent, or Firm* — Kilpatrick Townsend & Stockton LLP

(57) ABSTRACT

Wireless power transmitting devices according to embodiments of the present technology may include a contact surface configured to support one or more wireless power receiving devices. The wireless power transmitting devices may include a plurality of coils. The wireless power transmitting devices may also include a shield positioned between the plurality of coils and the contact surface. The shield may include one or more shield members, each shield member axially aligned with a separate coil of the plurality of coils, and may include a multilayer structure exhibiting various conductivities.

15 Claims, 7 Drawing Sheets

(51) Int. Cl.
    *H01F 27/28*     (2006.01)
    *H01F 27/36*     (2006.01)
    *H02J 50/12*     (2016.01)

(56) References Cited

U.S. PATENT DOCUMENTS

2018/0090971 A1*   3/2018   Graham ................ H01F 27/325
2019/0027298 A1*   1/2019   Jadidian .............. H01F 27/2885

FOREIGN PATENT DOCUMENTS

| CN | 106961168 A | 7/2017 |
| --- | --- | --- |
| CN | 107872098 A | 4/2018 |
| CN | 108028551 A | 5/2018 |
| WO | 2007/090168 A2 | 9/2007 |

OTHER PUBLICATIONS

"Evaluation Report of Utility Model Patent." dated Apr. 2, 2020 in Chinese Patent No. 2019207077214. 11 pages. (includes English outline of action only).

\* cited by examiner

ELECTRIC SHIELDING STRUCTURES

CROSS-REFERENCE TO RELATED APPLICATIONS

This application claims the benefit of U.S. Provisional Application No. 62/688,547, filed Jun. 22, 2018, entitled "ELECTRIC SHIELDING STRUCTURES", and which is hereby incorporated by reference in its entirety for all purposes.

TECHNICAL FIELD

The present technology relates to wireless charging systems. More specifically, the present technology relates to shielding structures for wireless charging systems.

BACKGROUND

Wireless charging systems allow power transmission to devices without requiring a power cord or other connective wire coupled to the device to be powered or recharged. Wireless charging systems, as well as the devices being charged, may produce noise and emissions that can reduce charging efficiency, and may be subject to regulatory compliance.

SUMMARY

Wireless power transmitting devices according to embodiments of the present technology may include a contact surface configured to support one or more wireless power receiving devices. The wireless power transmitting devices may include a plurality of coils. The wireless power transmitting devices may also include a shield positioned between the plurality of coils and the contact surface. The shield may include one or more shield members, each shield member axially aligned with a separate coil of the plurality of coils.

In some embodiments, the shield may include a conductive chassis extending about a perimeter of the shield. The shield may include a conductive sheet spanning an internal area defined by the conductive chassis. The conductive sheet may include a first material, and the one or more shield members may include a second material. The conductive sheet may be characterized by a higher sheet resistance than the shield members. The shield may include a conductive drain extending from at least one shield member of the one or more shield members to the conductive chassis. The shield may include a plurality of shield members, and each shield member may be electrically coupled with another shield member with a bridge or may be electrically coupled with the conductive chassis with a conductive drain.

In some embodiments, the conductive drain may be characterized by an arcuate shape. The conductive drain may be positioned between the at least one shield member and the conductive chassis, and the conductive drain may be shaped and positioned to limit overlap with an underlying coil relative to a straight-member conductive drain. Each coil of the plurality of coils may be characterized by a substantially annular shape, and each shield member of the one or more shield members may include a body characterized by a substantially annular shape. Each shield member of the one or more shield members may define a gap extending from an inner annular edge of the body to an outer annular edge of the body, and the gap may form a discontinuity about a circumference of each shield member. Each shield member may further define a plurality of slots extending from the inner annular edge of the body towards the outer annular edge of the body. Each shield member of the one or more shield members may include a grounding pin extending from an inner annular edge of the body and electrically coupling the shield member with a ground of the wireless power transmitting device.

Some embodiments of the present technology may also encompass a wireless power transmitting device. The device may include a contact surface configured to support one or more wireless power receiving devices. The device may include a first layer of coils distributed in a first planar arrangement. The device may include a second layer of coils vertically offset from the first layer of coils and positioned between the contact surface and the first layer of coils. The second layer of coils may be distributed in a second planar arrangement whereby coils of the second layer of coils are laterally offset from coils of the first planar arrangement. The device may also include a shield positioned between the second layer of coils and the contact surface. The shield may include a shield member overlying and aligned with a coil of the second layer of coils.

In some embodiments, the shield may include a conductive chassis extending about a perimeter of the shield. The shield may include a conductive sheet spanning an internal area defined by the conductive chassis. The conductive sheet may include silver, and the shield member may include copper. The shield may include a plurality of shield members, and each shield member may be electrically coupled with another shield member with a bridge or may be electrically coupled with the conductive chassis with a conductive drain.

Some embodiments of the present technology may also encompass a wireless power transmitting device. The device may include a contact surface configured to support one or more wireless power receiving devices. The device may include a plurality of coils. The device may also include a shield positioned between the plurality of coils and the contact surface. The shield may include a conductive chassis, a conductive sheet extending across an internal area defined by the conductive chassis, and a shield member positioned on the conductive sheet and overlying a coil of the plurality of coils.

In some embodiments, the conductive sheet may include a first material, and the shield member may include a second material. The conductive sheet may be characterized by a higher sheet resistance than the shield member. The shield may include a plurality of shield members, and each shield member may be electrically coupled with another shield member with a bridge or may be electrically coupled with the conductive chassis with a conductive drain. Each coil of the plurality of coils may be characterized by a substantially annular shape, and each shield member of the plurality of shield members may include a body characterized by a substantially annular shape. Each shield member of the plurality of shield members may define a gap extending from an inner annular edge of the body to an outer annular edge of the body, and the gap may form a discontinuity about a circumference of each shield member body.

Such technology may provide numerous benefits over conventional technology. For example, the present systems may reduce device emissions and electrical noise. Additionally, the systems may reduce eddy currents on shield components and limit an impact on charging efficiency. These and other embodiments, along with many of their advantages and features, are described in more detail in conjunction with the below description and attached figures.

BRIEF DESCRIPTION OF THE DRAWINGS

A further understanding of the nature and advantages of the disclosed embodiments may be realized by reference to the remaining portions of the specification and the drawings.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

A wireless power system may include a wireless power transmitting device that allows power to be transmitted wirelessly to a wireless power receiving device. The wireless power transmitting device may be a device having a number of forms including a wireless charging mat, a wireless charging puck, a wireless charging stand, a wireless charging table, or other wireless power transmitting equipment. The wireless power transmitting device may include one or more coils, such as induction coils or wound coils, that are used in transmitting wireless power to one or more wireless power receiving coils in wireless power receiving devices. The wireless power receiving devices may be any number of rechargeable devices that incorporate an induction coil or coils configured to receive power from the transmitting coil or coils. Any device may be configured to receive wireless power, including portable devices including cellular telephones, electronic watches, wearable devices including fitness devices, media players, computers including laptop computers and tablet computers, battery-powered earphones, remote controls, or any other electronic device or other wireless power receiving equipment.

During operation, the wireless power transmitting device may supply alternating current signals to one or more wireless power transmitting coils. In response, the transmission coils may transmit alternating-current electromagnetic signals, or wireless power signals, to one or more corresponding coils in the wireless power receiving device. Rectifier circuitry in the wireless power receiving device may convert the received wireless power signals into direct-current (DC) power for powering the wireless power receiving device, or recharging a battery, for example.

Figure 1:
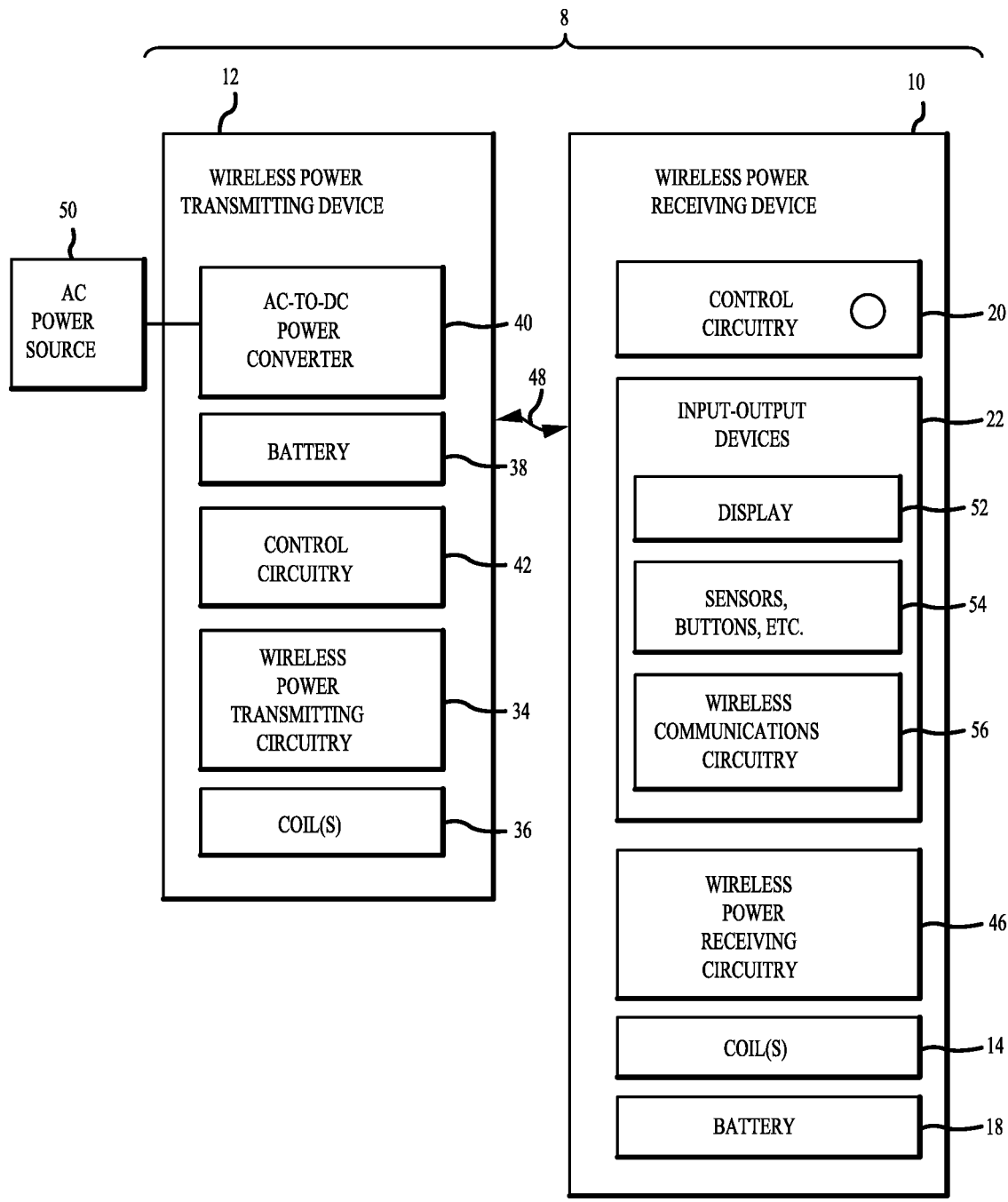
FIG. 1 shows a schematic diagram of a wireless charging system according to some embodiments of the present technology.

An illustrative wireless power system or wireless charging system is shown in FIG. 1. As illustrated, wireless power system 8 may include wireless power transmitting device 12, and one or more wireless power receiving devices, such as wireless power receiving device 10. Device 12 may be a stand-alone device such as a wireless charging mat, may be built into furniture, or may be other wireless charging equipment. Device 10 may be any portable electronic device including any of the components previously described. During operation of system 8, a user may place one or more devices 10 on a contact surface of device 12, which may constitute a charging surface. Power transmitting device 12 may be coupled with a source of alternating-current voltage such as alternating-current power source 50, such as a wall outlet that supplies line power or other source of mains electricity or a portable power source, which may include an additional device such as a laptop computer, for example. Power transmitting device 12 may also or alternatively include a battery, such as battery 38, for supplying power. A power converter, such as AC-DC power converter 40, can convert power from a mains power source or other AC power source into DC power that may be used to power control circuitry 42 and other circuitry in device 12. During operation, control circuitry 42 may use wireless power transmitting circuitry 34 and one or more coils 36, which may be electrically coupled with circuitry 34, to transmit alternating-current electromagnetic signals 48 to device 10, and which may provide wireless power to wireless power receiving circuitry 46 of device 10.

Power transmitting circuitry 34 may include switching circuitry, such as transistors in an inverter circuit, which may be engaged or disengaged based on control signals provided by control circuitry 42 to create AC current signals through appropriate coils 36. As the AC currents pass through a coil 36 that is being driven by the inverter circuit, alternating-current electromagnetic fields, which may constitute wireless power signals 48, may be produced. The fields may be received by one or more corresponding coils 14 coupled with wireless power receiving circuitry 46 in receiving device 10. When the alternating-current electromagnetic fields are received by coil 14, corresponding AC currents and voltages may be induced in coil 14. Rectifier circuitry in circuitry 46 may convert received AC signals associated with wireless power signals from one or more coils 14 into DC voltage signals for powering device 10. The DC voltages may be used in directly powering components in device 10 such as display 52, buttons, components, or other sensors 54, wireless communications circuitry 56, or other input-output devices 22 and/or control circuitry 20. The converted voltages may also be used to charge an internal battery in device 10, such as battery 18.

Devices 12 and 10 include control circuitry 42 and 20, which may include storage and processing circuitry such as microprocessors, microcontrollers, and/or application-specific integrated circuits with processing circuits. Control circuitry 42 and 20 may be configured to execute instructions for implementing desired control and communications features in system 8. For example, control circuitry 42 and/or 20 may be used in determining power transmission levels, processing sensor data, processing user input, processing other information such as information on wireless coupling efficiency from transmitting circuitry 34, processing information from receiving circuitry 46, using information from circuitry 34 and/or 46, such as signal measurements on output circuitry in circuitry 34 and other information from circuitry 34 and/or 46, to determine when to start and stop wireless charging operations. The circuitry may be used in adjusting charging parameters such as charging frequencies, determining coil assignments in a multi-coil array, measuring wireless power transmission levels, and performing other control functions.

Figure 2:
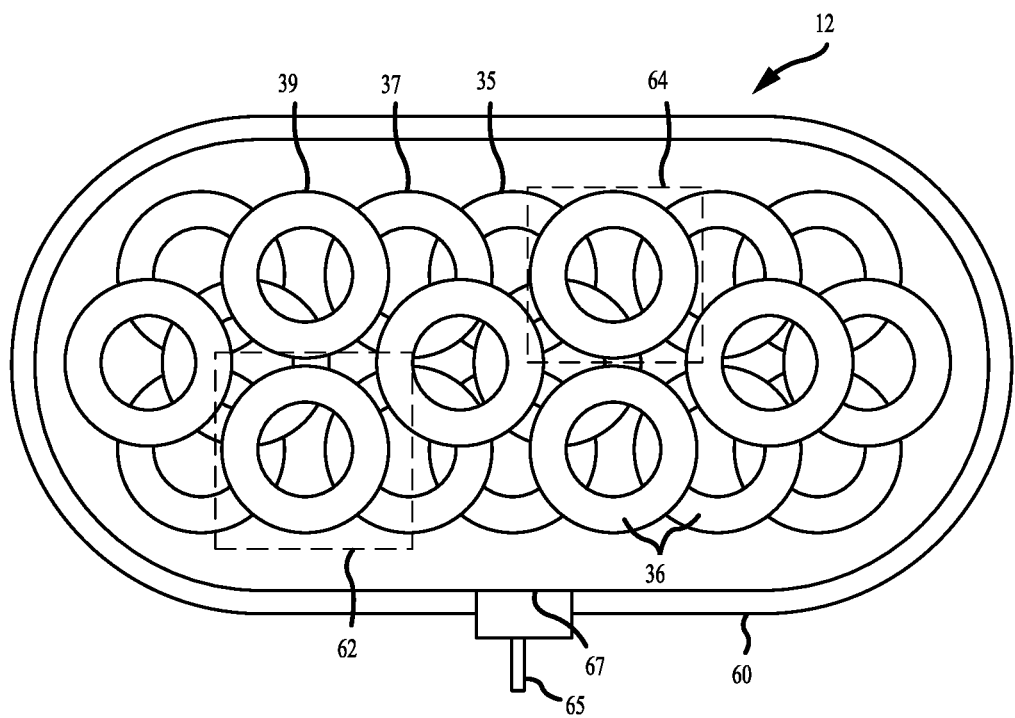
FIG. 2 shows a schematic plan view of a wireless power transmitting device according to some embodiments of the present technology.

In an exemplary system, wireless transmitting device 12 may be a wireless charging mat or other wireless power transmitting equipment that may include an array of coils 36 configured to supply wireless power over a wireless charging surface. An illustrative arrangement is shown in FIG. 2, where device 12 includes an array of coils 36 that may be used in wireless charging operations as previously explained. Wireless transmitting device 12 may include an overlying contact surface 60 configured to detect when a wireless power receiving device is placed on the contact surface. For example, sensors or other devices may detect the presence of a device having wireless power receiving capabilities.

Coils 36 are illustrated in an exemplary pattern in which multiple layers of coils are distributed in a stacked arrangement within device 12. In other embodiments similarly encompassed by the present technology more or fewer coils may be included in the wireless transmitting device 12 including 1 coil or 2 or more coils, including greater than or about 5 coils, greater than or about 10 coils, greater than or about 15 coils, greater than or about 20 coils, greater than or about 50 coils, greater than or about 100 coils, greater than or about 1,000 coils, or more depending on the size, shape, and patterning of the coils 36, as well as the size and shape of wireless power transmitting device 12. For example, in some embodiments, device 12 may be the size of a placemat or smaller, while in other embodiments device 12 may be a conference table having dimensions of several meters. Coils 36 may be distributed in any pattern and may be arranged in any number of configurations including any number of layers. In embodiments encompassed by the present technology the coils may be all of a similar size and shape as illustrated, although in other embodiments coils of different sizes and shapes may be used together within a device. In some embodiments, coils 36 may be arranged in a single row, two rows, three rows, five rows, or more, depending on the distribution of coils. For example, coils 36 may be arranged in each row so as not to completely overlap a coil in any other row. As illustrated, although coils 36 overlap underlying coils, there is a lateral offset between the coils in each row, as well as in all rows. This offset may both increase an area for charging coverage across the contact surface 60, as well as limit or reduce detrimental or interference effects on proximate coils. Coils 36 may not be exposed in some embodiments, and may be enclosed or covered by a planar dielectric structure such as a plastic member, or other material or structure, forming contact surface 60.

During operation, a user may place one or more devices 10 on contact surface 60, which may be configured to support one or more wireless power receiving devices. Foreign objects such as coins, paper clips, scraps of metal foil, and/or other foreign conductive objects may be accidentally placed on surface 60. System 8 may be configured to automatically detect whether conductive objects located on surface 60 correspond to devices 10 or incompatible foreign objects, and may respond in each case appropriately, such as by engaging coils proximate to devices 10, while disengaging or not engaging coils proximate incompatible foreign objects. For example, external objects 62 and 64 may overlap one or more coils 36. In some embodiments, objects 62 and 64 may each be portable electronic devices 10, and system 8 may engage one or more coils proximate or underlying the devices. In other situations, either object 62 or 64 may be an incompatible object, and system 8 may not engage, or may actively disengage coils proximate or underlying the devices. In some embodiments, before system 8 allows wireless power to be transmitted to some objects, system 8 may check whether objects located on surface 60 include sensitive components such as radio-frequency identification (RFID) devices or other potentially sensitive electronic equipment that could be damaged upon exposure to fields from coils 36. System 8 may engage coils at reduced power in such situations, or may not engage coils proximate sensitive devices.

Wireless charging systems may generally operate on magnetic fields. However, the components of both the wireless power transmission device and the wireless power receiving device may include other electrical components and conductive components, which may produce or enhance radiative emissions and conductive emissions that interfere with charging and other operations. Electric noise generated by components or by specific characteristics of the transmitting or receiving devices may be capacitively coupled to the adjacent device, which may result in further enhancement of the emissions. An electric field shield, or e-shield or shield as will be described throughout the disclosure, may be positioned between the coils of the transmitting and receiving devices. In the simplest sense, a conductive sheet may be positioned across the surface of the transmitter to block noise or unwanted emissions, but such a sheet would simultaneously block the charging process. To avoid drastic reductions in charging efficiency, a solid e-shield may be limited to lower conductivity components and/or minimal thicknesses. However, these concessions may adversely limit the operation on emissions. Slots or cuts may be formed in a solid shield, but in multiple-coil arrangements introducing slots may increase unwanted eddy currents that act back upon the magnetic field and further affect charging efficiency. Accordingly, electric field shields for multiple-coil charging systems face many competing challenges.

The present technology may include a shield, or e-shield, utilizing one or more components configured to reduce electric field strengths on coils characterized by higher emissions, while limiting an impact on magnetic fields. Returning to FIG. 2, an exemplary wireless power transmitting device 12 may include multiple layers of coils, or simply multiple closely spaced coils. Each coil of the multiple coils or plurality of coils may produce different electric fields based on a number of factors. For example, coils nearer to an edge of the device may be subject to a more asymmetrical ground plane, while coils nearer to a center of the device may have a more symmetrical ground plane. Exemplary devices may include a ferrite layer beneath the coils, which may also affect coils in a non-uniform manner depending on the thickness and shape of the ferrite. Additionally, each coil may be characterized by a different rotation of the coil, as well as different termination configurations in whether the terminations are co-located or positioned on separate sides of the coil. Wireless power transmitting device 12 may also include a cable 65, which may couple with power source 50 described previously, and may couple with device 12 at connector 67. Each coil may be distributed at a distance from connector 67, which may further impact electrical characteristics. For example, while one coil may be proximate connector 67, another coil may be twice the distance to connector 67, which may impact the emissions at certain frequencies. Consequently, many characteristics of the device 12 and associated components may impact the electrical emissions.

In some embodiments having layers of coils, coils adjacent the contact surface may have increased emissions over coils beneath the top layer. For example, FIG. 2 illustrates a configuration including three layers of coils, although fewer or more layers may be included. A first layer of coils 35 may be seated closest to a ferrite or other material layer, when included, and may be furthest from contact surface 60. First layer of coils 35 is illustrated as having six coils in a first arrangement across a first plane, although more or less coils as well as any other lateral distribution across the first plane is similarly encompassed, such as seven coils, eight coils, or more. A second layer of coils 37 may be included on a second plane vertically offset from, such as above, the first plane. The second coils may be distributed in a second arrangement, which may be similar to or different from the arrangement of the first layer of coils. As illustrated, the second layer of coils includes seven coils across a second plane, although more or less coils as well as any other lateral distribution across the second plane is similarly encompassed. The coils of the second layer of coils may be laterally offset from coils in the arrangement of the first layer of coils. Hence, in some embodiments no coils or few coils of the second layer of coils may fully overlap any coil of the first layer of coils.

The illustrated embodiment also includes a third layer of coils 39 overlying the second layer of coils 37. The third layer of coils may be closest to the contact surface 60. The third layer of coils may be included on a third plane vertically offset from, such as above the second plane and/or first plane. The third coils may be distributed in a third arrangement, which may be similar to or different from the arrangement of the first or second layers of coils. As illustrated, the third layer of coils includes seven coils across a third plane in a similar arrangement as the second layer of coils, although more or less coils as well as any other lateral distribution across the third plane is similarly encompassed. The third layer of coils may be laterally offset from coils in the first and second layers, and in some embodiments no coils or few coils of the third layer of coils may fully overlap any coil of the first layer and/or second layer of coils. As seen in the example illustrated, upper coils, such as those in the second and third layers of coils, may act as a partial shield to underlying coils, which may reduce the emissions of the underlying coils. However, the uppermost coils in the third layer of coils, without an additional shield, may not be affected by underlying components, and may generate higher emissions than coils in the second layer and first layer.

In some embodiments of the present technology, a shield may be included that may selectively target coils predetermined to contribute higher levels of emissions, or may contribute emissions at particular frequencies to be controlled. Whether from a lateral position within the device configuration, or from additional characteristics such as a position in an uppermost layer, for example, individual coils may be selectively targeted with e-shields according to the embodiments of the present technology.

Figure 3A:
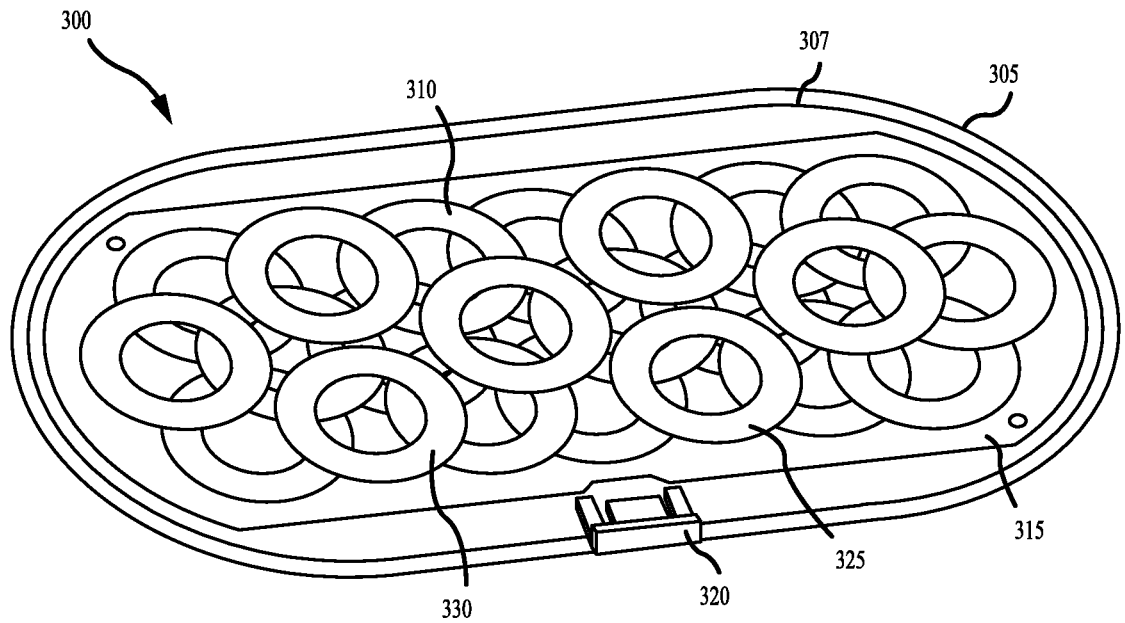
FIG. 3A shows a schematic perspective view of a wireless power transmitting device according to some embodiments of the present technology.

FIG. 3A shows a schematic perspective view of a wireless power transmitting device 300 according to some embodiments of the present technology. Wireless power transmitting device 300 may include any of the components of wireless power charging device 12 described above, and may include any of the components and arrangements previously described. Device 300 may include a housing 305 incorporating a number of components for providing wireless power to one or more receiving devices. In some embodiments housing 305 may be or include a shell or casing in which the components may be contained, and may be of any number of form factors. For example, housing 305 may be a mat, plate, puck, or other similarly sized component, although in other embodiments housing 305 may be a table, countertop, nightstand, desk, or any surface within which additional components for providing wireless power may be contained.

Housing 305 may be made of any number of materials including plastics, woods, metals, stones, or any material that may be formed, carved, or hollowed to allow placement of additional components. Housing 305 may include a contact surface 307, which may be a dielectric material or any other material that may be configured to support one or more wireless power receiving devices. For example, in some embodiments a contact surface 307 extending across a top area of the housing may be a conductive material, although in some embodiments the choice of conductive material may be configured to limit blocking of or interference with magnetic or other radiated waves through the contact surface, which may provide wireless charging capabilities.

Within housing 305 may be a number of components including circuitry, which may include a circuit board, sensors for detecting objects on or proximate contact surface 307 and for measuring or controlling the provision of wireless power from device 300, as well as any other materials as previously described. Housing 305 may include material 315, which may be ferrite in one example, or any other material that may be used to block, direct, or otherwise contribute to control of generated wireless power fields. Above material 315 may be one or more coils 310, such as a plurality of coils, which may be or include characteristics of coils 36 described above, and may be used to contribute to the generation of wireless power, which may be transmitted to a receiving device positioned on contact surface 307. Coils 310 may include any number of coils that may be distributed and arranged in any pattern across an internal volume of device 300. The coils may be included in a single layer, or may be included in multiple layers, including greater than or about 2 layers, greater than or about 3 layers, greater than or about 4 layers, greater than or about 5 layers, greater than or about 10 layers, or more. Device 300 may also include a connector 320, which may allow a power source to be coupled with wireless power transmitting device 300, and may operate as an electrical ground path from the device.

Wireless power transmitting device 300 may also include a shield 325 positioned between coils 310 and contact surface 307. Shield 325 may include one or more shield members 330 that may be distributed across coils 310. Shield members 330 may be stand-alone components as illustrated, and thus shield 325 may include multiple separate components, although as will be described further below in additional embodiments shield 325 may include a one-piece design of the components or shield members. Shield members 330 may be positioned to affect electric noise from one or more of the coils 310. As previously explained, based on a number of factors, certain coils may contribute to electric noise generation more than other coils. Operational testing of a particular device 300 form factor may identify one or more coils contributing higher emissions. For example, in configurations including multiple layers of coils, a top layer of coils may be contributing higher emissions than lower layers of coils. Shield members 330 may be positioned in a configuration related to the coils contributing to increased radiative or conductive emissions.

As shown in the figure, shield members 330 may be positioned over one or more coils, and may be positioned to substantially overlap individual coils. In one embodiment shown in FIG. 3A, shield members 330 are arranged in a layer to distribute one shield member 330 over each coil 310 in a top layer of coils, such as all seven coils as described in top layer of coils 39 of FIG. 2. It is to be understood that when more or fewer coils are included, more or fewer shield members may be included as well. Additionally, shield members 330 may not be positioned over every coil within a particular coil layer. Because shield members 330 may impact charging efficiency, the number of shield members may be selected to beneficially reduce electrical noise, while minimizing an impact on charging. Shield members 330 may be axially aligned with individual coils 310, and may be sized to be of a smaller diameter, substantially similar diameter, or greater diameter than a coil 310 over which the shield member 330 is positioned.

Figure 3B:
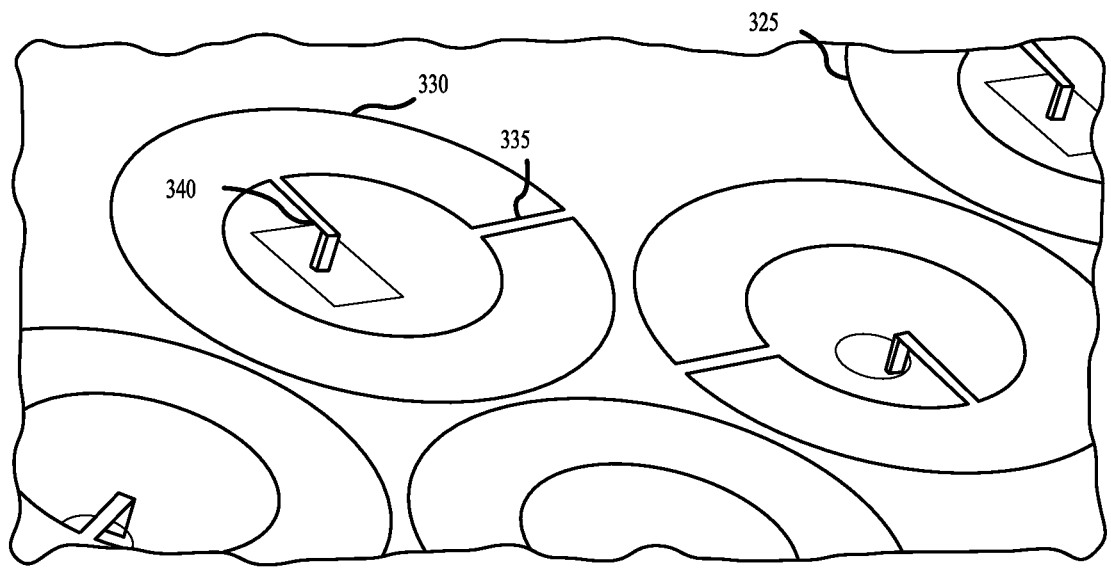
FIG. 3B shows a partial schematic perspective view of a wireless power transmitting device according to some embodiments of the present technology.

Turning to FIG. 3B is shown a partial schematic perspective view of wireless power transmitting device 300 according to some embodiments of the present technology. FIG. 3B may show an enhanced view of shield 325 and shield members 330. The coils of wireless power transmitting device 300 may include wound coils that may each be characterized by a substantially annular shape, which may allow one or more wire connections within a central area defined by the annulus. Although the shields may be characterized by any shape, including an elliptical or other geometric pattern, in some embodiments shield members 330 may also be characterized by a substantially annular shape. Such a shape may correspond to the annular shape of the coil over which the shield member is being positioned, while limiting effects on additional coils, which may be present in lower layers of coils. For example, when a solid shield member is utilized, the shield member may overlap the intended coil, and may also cover more than only the overlapping portion of underlying coils, and may also cover underlying coil portions positioned under a central area defined by an overlying coil. When covered by a shield, the shield may further limit wireless charging field transmission for the underlying coil or coils, which may further reduce charging efficiency of the wireless power transmitting device. Accordingly, in some embodiments shield members 330 may be characterized by an annular shape to limit impact on underlying coils separate from the coil with which the shield member is associated.

Shield members 330 may define a gap 335 formed radially across or in some configuration through each shield member 330, as will be described in further detail below. Gap 335 may fully extend from an inner annular edge of the shield member 330 to an outer annular edge of the shield member, which may form a discontinuity about a circumference of each shield member. In embodiments where shield member 330 may be characterized by a non-circular or elliptical geometry, a gap may be formed as a discontinuity about a perimeter of the shield member, which may also be termed a circumference. Shield members 330 may be a conductive material in some embodiments to allow blocking of electrical noise. However, such a conductor proximate a source coil may allow eddy currents to be induced on the shield members 330 from developed magnetic fields from the underlying coils. If the shield member forms a complete circular shape, or forming a complete loop, the developed eddy currents may increasingly react back on the coil opposing the magnetic field and further reducing charging efficiency of the device. Accordingly, gap 335 may reduce or limit eddy current generation as well as the accompanying heat generation from the eddy currents.

Shield members 330 may include a grounding pin 340, or grounding member allowing dissipation of generated electrical currents on the shield members 330. Grounding pin 340 may extend from either the inner annular edge or the outer annular edge of the shield members 330. As illustrated, in some embodiments the grounding pin 340 extends from an inner annular edge of the shield member. Grounding pin 340 may electrically couple the shield member with an electrical ground of the wireless power transmitting device 300. For example, shield members 330 may be at an uppermost layer within the housing of the wireless power transmitting device, and may be located just below a contact surface of the housing. A ground within the housing may be located at a lower plane within the housing, including on an underlying circuit board, and may be located below all coil layers, below a ferrite or other material layer, or elsewhere. Grounding pin 340 may be adapted to extend from an inner annular edge of each shield member and extend laterally to or towards a central region defined by the shield member. The grounding pin 340 may then transition vertically and extend down or otherwise vertically within the housing to electrically connect or couple with an electrical ground within the device. In other embodiments, the grounding pin 340 may extend laterally to an edge or other location to couple with the housing, which may provide a ground path. Additionally, in some embodiments, grounding pins 340 may extend to one or more other shield members to electrically couple the shields, which may then include one or more ground paths from one or more other shield members to the housing laterally, vertically, or otherwise, which may be similar to any of the additional embodiments described elsewhere.

Shield members 330 may be or include a conductive material, which may facilitate a reduction in electrical noise. The shield members may include any number of materials or combinations of materials, which may be or include silver, copper, aluminum, zinc, nickel, stainless steel, or any other material which may be used to reduce the electrical noise transmitted or formed within the wireless power transmitting device.

Additional shield designs are also encompassed in the present technology, which may further control radiative and conductive emissions from or to the wireless power transmitting device. As explained previously, coils in lower layers of coils may also produce emissions, although these emissions may be less than those in upper layers of coils, or coils in a similar plane, which may be characterized by higher emissions due to other factors described above. These emissions may be reduced or controlled in some embodiments by utilizing a compound or multi-layer e-shield that may address coils generating lower levels of emissions due to their lateral location or position in a lower layer of coils. The multi-layer or multi-material e-shields may further control noise associated with wireless charging operations.

Figure 4:
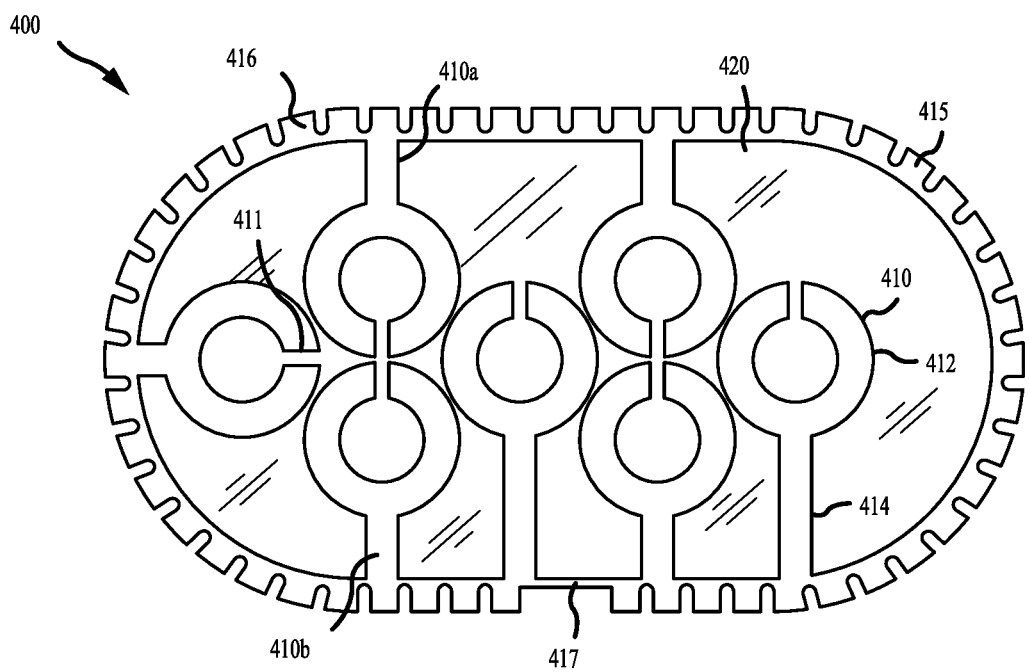
FIG. 4 shows a schematic plan view of an exemplary shield for a wireless power transmitting device according to some embodiments of the present technology.

FIG. 4 shows a schematic plan view of an exemplary shield 400 for a wireless power transmitting device according to some embodiments of the present technology. Shield 400 may be a multi-layer or multi-material shield providing additional reduction in electrical noise by providing a low-level reduction to all coils included within a device, as well as providing a targeted reduction in individual coils contributing increased emissions. Shield 400 may be utilized with any of the wireless power transmitting devices previously described, and may be positioned within a device housing as an internal component. The shield 400 may be positioned proximate a contact surface of the wireless power receiving device, and may be positioned between a contact surface and a plurality of coils used for wireless power charging. Any device with which shield 400 may be used may include any number, configuration, or arrangement of coils, including coils of different sizes, shapes, orientations, and layers.

Shield 400 may include a number of shield members 410 disposed within the shield 400. Shield members 410 may include any of the patterns, materials, or characteristics as shield members 330 described previously. Shield members 410 may be positioned with the shield 400 such that when shield 400 is incorporated within a wireless power transmitting device, shield members 410 are axially aligned or otherwise associated with or overlie particular coils of the device. Shield 400 is illustrated with seven shield members 410 distributed in a similar orientation as described previously relative to the seven coils of the top layer of coils 39 included in that exemplary device. However, it is to be understood that shield 400 may include any number of shield members which may be used or positioned within the shield to selectively overlie particular coils determined to generate electrical noise in any configuration of coils. The remaining portions of the disclosure will similarly be based on the coil configuration illustrated in FIG. 2, although it is to be understood that any number of additional or alternative configurations as described previously may similarly benefit from incorporation of a shield 400, or variation thereof as discussed elsewhere.

Shield 400 may include a chassis 415 that may be made of any material, and may include a conductive material. For example, chassis 415 may be or include any of the previously identified materials, or any other conductive material, which may allow electrical current to be distributed about the chassis. In some embodiments, chassis 415 may be the same material as shield members 410. Chassis 415 may be characterized by any number of designs, and may extend about a perimeter of the shield. Chassis 415 may be sized according to the size of the corresponding wireless power transmitting device in which shield 400 may be incorporated. Chassis 415 may be sized to couple or connect with a housing of the device, which may be any of the housing materials previously described. Chassis 415 may define a coupling location 417, which may allow transfer of electrical current to an electrical ground of the device, including through a cable coupled with the device as previously described. Coupling location 417 may be a pattern or profile allowing overlap of conductive chassis 415 with a conductive aspect of an associated housing, which may allow transfer of current from the shield 400.

The profile of chassis 415 may form an elliptical, polygonal, or other geometric structure, which may form a loop of conductive material. To limit eddy currents induced on the conductive chassis 415, the chassis may define a number of contact tips 416 distributed about the chassis. As illustrated, contact tips 416 are formed from an outer edge of the chassis towards an inner edge, such as an inner annular edge, which may form a continuous edge about the structure. In other embodiments, the chassis may be characterized by the reverse profile in which an outer edge of the chassis forms a continuous edge, while contact tips 416 are formed from the inner edge towards the outer edge. Any number of contact tips may be formed about the chassis, and the number may depend on the size of the shield and/or the extent of impact on charging operations. For example, a shield characterized by a diameter of 50 cm or less, may define up to or at least 50 contact tips, while a shield characterized by a diameter of 5 meters, less, or more, may define less than 300 contact tips. In other embodiments a shield characterized by a diameter of 5 meters may define at least 1,000 contact tips in other configurations. Any number of contact tips may be formed, which may facilitate a reduction in eddy current effects on the charging capabilities of the wireless power transmitting device.

Shield 400 may also include a sheet 420 spanning an internal area defined by the chassis 415. Sheet 420 may further facilitate a reduction in electrical noise. Shield members 410 may be formed over or under the sheet 420, and in some embodiments sheet 420 may be formed about shield members 410 so that sheet 420 and shield members 410 are coplanar along a plane defined by sheet 420. Sheet 420 may be or include any of the conductive materials previously described. The conductivity of sheet 420 may be tuned to limit an impact on the charging capabilities of the associated wireless power transmitting device. For example, by increasing a thickness of sheet 420 or selecting a more conductive material, sheet 420 may further reduce emissions. However, as thickness and/or conductivity increases across sheet 420, device charging capability may be reduced, and may be limited. Accordingly, in some embodiments sheet 420 may be sized and selected to be characterized by a lower conductivity than shield members 410 positioned across sheet 420.

For example, sheet 420 may include a thin-film conductive material, which may be characterized by a thickness of less than or about 1 μm, and may be characterized by a thickness of less than or about 500 nm, less than or about 250 nm, less than or about 100 nm, less than or about 90 nm, less than or about 80 nm, less than or about 70 nm, less than or about 60 nm, less than or about 50 nm, less than or about 40 nm, less than or about 30 nm, less than or about 20 nm, less than or about 10 nm, or less, as well as within any lesser range encompassed by these stated ranges. By forming sheet 420 at a reduced thickness, sheet 420 may be or include a more conductive material. For example, in some embodiments shield members may be or include copper, while sheet 420 may be or include silver. Although silver may be more conductive than copper, the thickness of sheet 420 may be such that sheet 420 is characterized by a sheet resistance higher than the shield members 410. Shield members 410 may be characterized by a thickness between or about 100 nm and about 100 μm, such as greater than or about 1 μm, greater than or about 10 μm, greater than or about 20 μm, greater than or about 30 μm, greater than or about 40 μm, greater than or about 50 μm, greater than or about 60 μm, greater than or about 70 μm, greater than or about 80 μm, greater than or about 90 μm, greater than or about 100 μm, or more. Consequently, the sheet resistance of shield members 410 may be lower than the sheet resistance of sheet 420. Because shield members 410 may be sized to specific coil sizes, the increased conductivity may facilitate reductions in electrical noise, while limiting reductions in magnetic fields or other mechanisms for wireless charging.

Shield members 410 may include a body 412 and an appendage 414 from each shield member body 412. In the illustrated embodiment, appendage 414 may constitute a conductive drain extending from the shield member body 412, which may be similar to the grounding pin previously described. The appendage 414 may also be a bridge as will be described further below. Body 412 of each shield member 410 may be sized and shaped to overlap an underlying coil, and may be positioned when shield 400 is coupled with a wireless power transmitting device to be axially aligned with an underlying coil of the device as previously described. Body 412 may include a gap 411 as discussed above, which may be formed from an inner annular edge through an outer annular edge of the shield member body, and which may form a discontinuity about a circumference or perimeter of the shield member to reduce an impact of eddy currents on the underlying coils. The location of the gap may affect electrical fields, and in some embodiments the shield members may be formed or positioned with consideration of the gap location of other shield members in the shield. For example, in some embodiments at least two shield members 410 may be arranged so that a gap formed in each respective body 412 may face a gap in the other shield member, which may be an adjacent shield member. Hence, as illustrated, in some embodiments, shield members 410a and 410b may be incorporated within shield 400 so that the gap in the associated body of shield member 410a may face or be in line with the gap in the associated body of shield member 410b.

Shield 400 may include at least one conductive drain extending from at least one shield member 410 to the conductive chassis 415. As illustrated, each appendage 414 shown in FIG. 4 forms a conductive drain extending from the body 412 of each shield member 410 to the chassis 415, and/or another ground source, which may include an underlying circuit board, for example. Each appendage may be any of the previously described conductive materials, and in some embodiments may be the same material as the shield member bodies. The location and formation of the drains may also affect emissions in different device configurations, and the conductive drains may overlap underlying coils, which may further impact charging efficiency of the associated device. For example, in some embodiments the chassis 415 may distribute current to coupling 417, where current may be delivered from the shield 400 to an associated wireless power transmitting device, and in some embodiments from a device to ground. The distance of travel from each shield may impact the effect on emissions. Accordingly, in some embodiments, additional appendage structures on the shields may be used to limit the length of distribution paths, which may improve emission reduction and/or effects on the wireless charging efficiency of the associated device.

FIGS. 5A-5F show schematic plan views of exemplary shields for a wireless power transmitting device according to some embodiments of the present technology. The illustrations may include variations on the shield structure of FIG. 4, and may include some or all of the components as discussed with FIG. 4. Although some of the illustrations do include a chassis, it is to be understood that a chassis may be included to distribute current as previously described, and the figures are more focused on variations in the shield member and appendage structures of the particular shield members. Any of the shields described below may include any of the materials or components described elsewhere, and may be incorporated with any of the wireless power transmitting devices described. Additionally, any of the specifically illustrated variations may be used in combination with other variations, coil or shield member arrangements, or any wireless power transmitting devices described elsewhere.

Figure 5A:
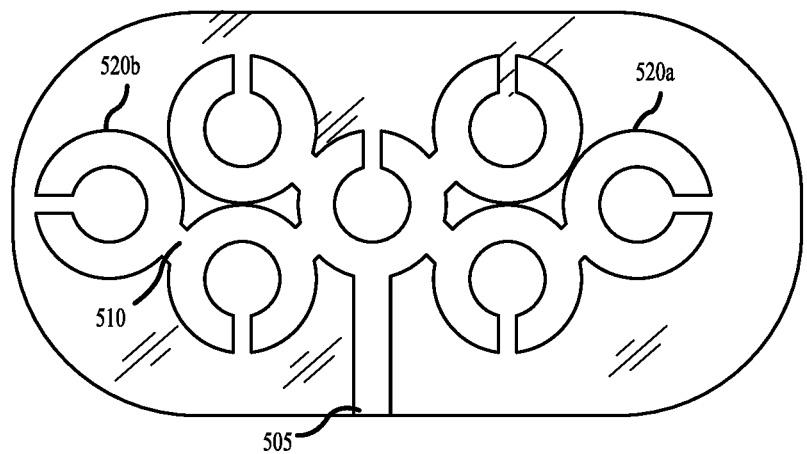
FIGS. 5A-5G show schematic plan views of exemplary shields for a wireless power transmitting device according to some embodiments of the present technology.

FIG. 5A illustrates a variation in the shield members in which one appendage 505 is a conductive drain extending from the body of the associated shield member to a conductive chassis and/or other ground or current distribution path, such as an underlying circuit board, for example. Each of the other appendages forms a bridge between the bodies of two shield members. As shown, appendage 510, as well as each other appendage but appendage 505, includes a short trace of material extending from the body of one shield member to the body of an adjacent shield member. FIG. 5A shows a single arrangement with bridges, and it is to be understood that any other organization of bridges is similarly encompassed where each shield member body is coupled with another shield member body.

Although utilizing bridges and a single drain may reduce the amount of material, and may reduce some of the conductive paths, such a configuration may also have a corresponding impact on operational efficiency. For example, as previously described, an associated wireless power transmitting device in which the shield configuration illustrated may be used may operate to charge multiple devices, such as a device positioned on opposite longitudinal sides of the transmitting device. In such a scenario, a coil underlying shield body 520a, and a coil underlying shield body 520b may be selectively engaged. In the configuration of FIG. 5A, all current may be delivered from a single path through the drain of appendage 505. Consequently, emissions collected on shield body 520a and emissions collected on shield body 520b may all flow towards one another and through appendage 505. However, depending on the devices being charged simultaneously, the noise from one charging may have some contributing effect on the noise from the other device. In some beneficial scenarios, these noise components may destructively cancel out, although in other scenarios some amount of constructive development may occur, which may further increase the generated noise, and reduce operating efficiency.

Figure 5B:
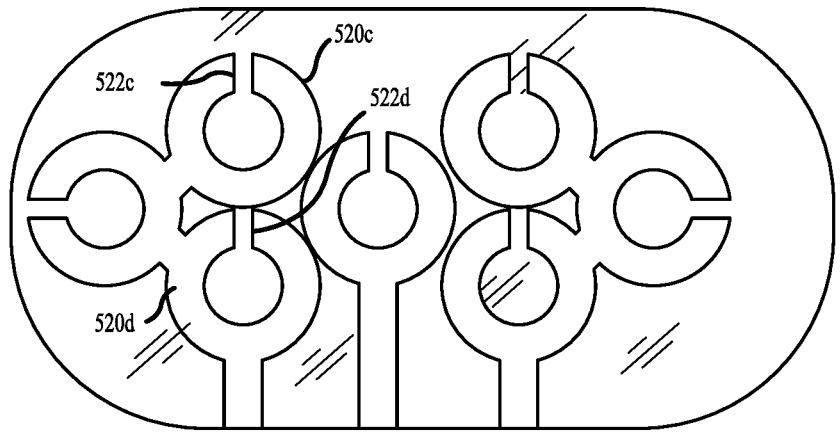

Consequently, including a combination of appendage configurations including some number of drains, and some number of bridges may improve these effects to accommodate a wider variety of operating conditions. FIG. 5B illustrates one possible scenario in which the same shield member body configuration may include an alternate appendage design. As illustrated, each shield member is electrically coupled with another shield member with a bridge, and/or is electrically coupled to an external edge of the shield, such as to a conductive chassis, with a conductive drain. This may improve the effects produced by multiple devices being charged simultaneously. As shown, the drains may be positioned towards a side of the shield, such as a side along which a ground connection may be made to an associated device as previously explained, although the drains may also be coupled with the chassis in any other location about the structure.

FIG. 5B also illustrates a shield body configuration in which some shield bodies may be positioned similar to an adjacent and inline shield body, and thus the gaps may be located at corresponding positions relative to the shield. For example, shield body 520c and shield body 520d may be positioned in line in a similar orientation. Accordingly, gap 522c of shield body 520c may be facing in a similar direction as the gap 522d of shield body 520d. FIGS. 4, 5A, and 5B illustrate some combinations for inline shield bodies in which the gaps are positioned facing one another, facing in opposite directions from one another, and facing in a similar direction, respectively. Any combination of these configurations may be used for different shield body pairs, or multiples, which may provide different effects on emissions.

Figure 5C:
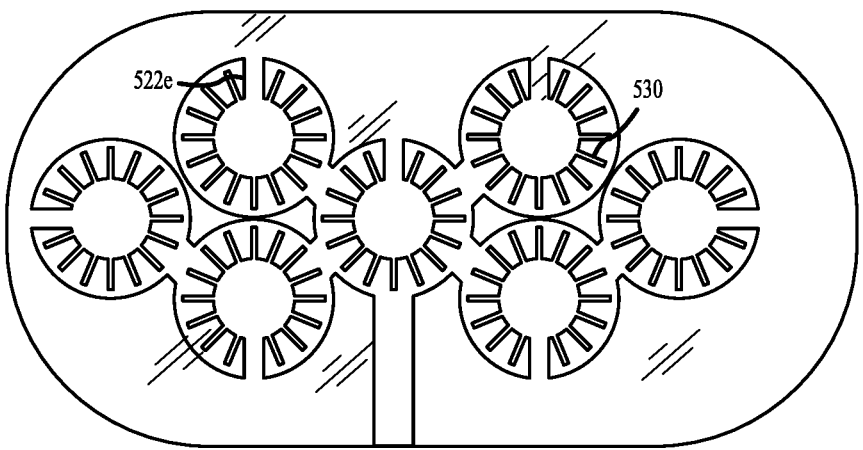

FIG. 5C illustrates a configuration in which a plurality of slots 530 are formed on the shield body. As explained previously, eddy currents may be induced on shields of the present technology. Although a gap formed along the shield body may reduce eddy currents, in some embodiments currents may still be circulating on the shield body due to the lengths or areas of the shield bodies. By forming a number of slots 530 on the shield body, eddy currents may be reduced even further by introducing a more complicated path about the shield. Slots 530 are shown as being defined by the shield bodies from an inner annular edge of the shield body towards an outer annular edge of the shield body, although the slots may also be formed from the outer annular edge of the shield body towards the inner annular edge of the shield body, as well as some combination of slots extending inward and outward in other embodiments.

Unlike a gap formed in each shield body, such as gap 522e, slots 530 may not fully extend to the outer radial edge of the shield body. Each shield body may define any number of slots, which may be based on the size of the shield member body, although exemplary configurations may include greater than or about 10 slots, greater than or about 50 slots, greater than or about 100 slots, greater than or about 500 slots, or more. FIG. 5C illustrates a similar arrangement of appendages as FIG. 5A, although it is to be understood that any shield member configuration may incorporate slots 530, including any variation illustrated, including shield members illustrated in FIG. 3A, as well as any variation not expressly illustrated but encompassed by the present technology as an adjustment to any of the illustrated variations.

Figure 5D:
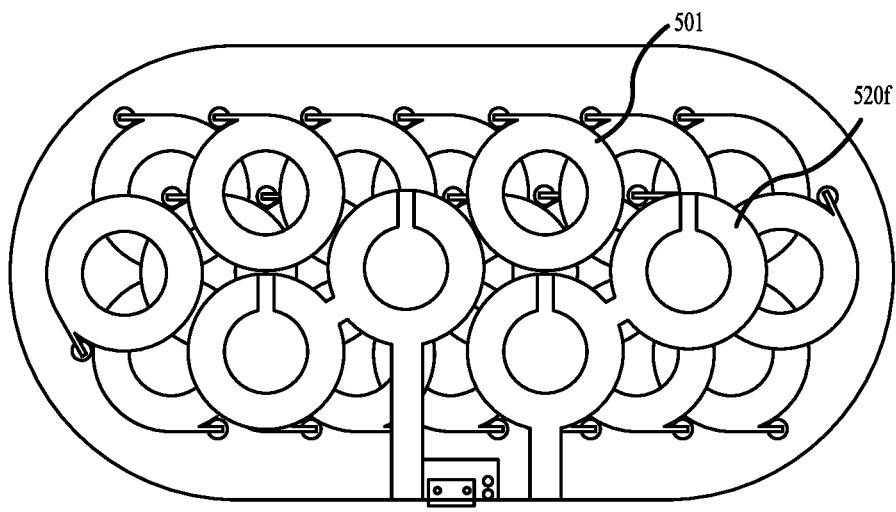

FIG. 5D illustrates another variation in which not all coils of the top layer of coils in a layered configuration may include an associated shield member. Such a configuration may also be applied in any planar arrangement of coils as well, and is not intended to be limited to layered configurations. Depending on the wireless power transmitting device size, power, or configuration, few coils may produce emissions to be controlled. In these scenarios, a shield, which may include any of the characteristics of other described shields, may include shield members that may cover only a portion of the coils. For example, coil 501 of the illustrated device may not contribute emissions to be addressed by a shield, or may contribute emissions at a level that may be addressed by a sheet, such as sheet 420 of an associated shield. The associated shield may then include shield members over coils generating greater emissions, such as a coil under shield member body 520f, for example. Any number of variations on this design may be utilized depending on the specific characteristics of a device and the particular coils generating emissions to be addressed. Additionally, FIG. 5D does not illustrate a sheet, such as sheet 420, to allow viewing of coils in a device with which the shield is coupled. It is to be understood that the technology also encompasses incorporation of a sheet and chassis, as well as any other component previously described.

Figure 5E:
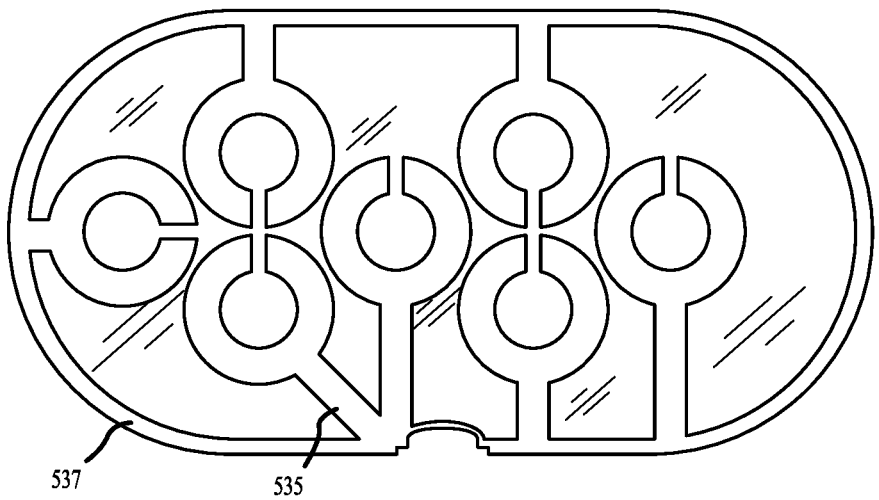
Figure 5F:
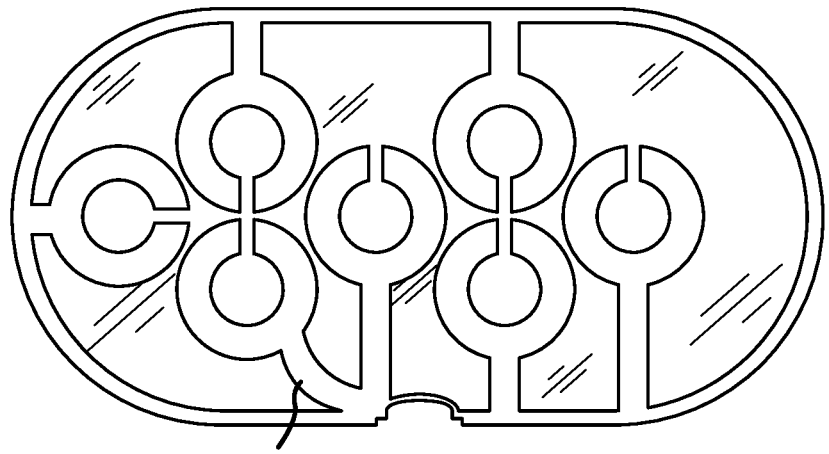

FIGS. 5E and 5F illustrate variations on particular appendage designs, and may be used in combination with any of the arrangements described elsewhere. For example, FIG. 5E illustrates an embodiment in which appendage 535 does not connect perpendicularly with chassis 537, but is angled towards a coupling where current may be delivered from the shield. Angling appendages may reduce path lengths, which may beneficially reduce emissions characteristics. Angling some or all appendages may additionally provide routes of conductive material to avoid underlying coil positions. For example, the angle of appendage 535, or any other appendage, may be selected to reduce the overlap with underlying coils that are not the target of the particular shield body. FIG. 5F shows an additional design that may limit overlap with other underlying coils by utilizing an arcuate appendage 540. Appendage 540 may be characterized by an arcuate shape that extends from a shield body to the chassis, or another appendage or shield body. The particular shape may be selected to limit overlap with an underlying coil, which may be less than if a straight-member conductive drain or bridge was utilized instead. The arcuate appendage may increase path length in some configurations, which may be balanced against the benefit of reducing overlap, to provide the most benefit at the system level for reducing emissions.

Figure 5G:
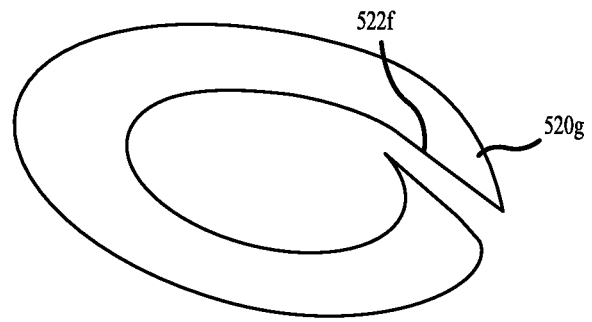

FIG. 5G shows an additional shield configuration that may be incorporated in any of the previously discussed designs. Shield member 520g illustrates a gap 522f configuration in which the gap may not extend in a linear direction radially across the shield member, although still extending radially through the entire shield member. Any number of configurations may be incorporated in various embodiments in which the gap may be formed or a section may be removed from a shield member in a number of ways. The gap may be formed to accommodate underlying components, or may be formed to provide particular performance characteristics, structural designs, or to facilitate placement in a variety of devices. Accordingly, in some embodiments the gap may be formed radially through a shield member, and may extend linearly, in a stepped or angular pattern, in an arcuate configuration as illustrated, or in any other manner to form a continuous break through the shield member.

By incorporating shields according to the present technology, emissions may be reduced or shifted from certain frequencies. For example, by incorporating shields according to the present technology, resonance associated with the coils may be shifted to a lower frequency. By shifting the resonant frequency of magnetic resonance emissions, emissions occurring at frequencies associated with specific functionalities, such as object detection on the transmission device, may be shifted to a lower frequency where the excitation may be reduced. For example, some devices may perform object detection on the transmission device at frequency ranges below 30 MHz, for example, such as between about 20 MHz and about 30 MHz, or between about 25 MHz and about 30 MHz. Accordingly, any particular functionality of the transmission device that may be occurring within these frequency ranges, may be impacted or impeded by resonance occurring from the magnetic field. However, by incorporating shield members over the coils may shift the resonance out of the operating states of the device, which may limit exciting the frequencies and impacting device operations.

Figure 6A:
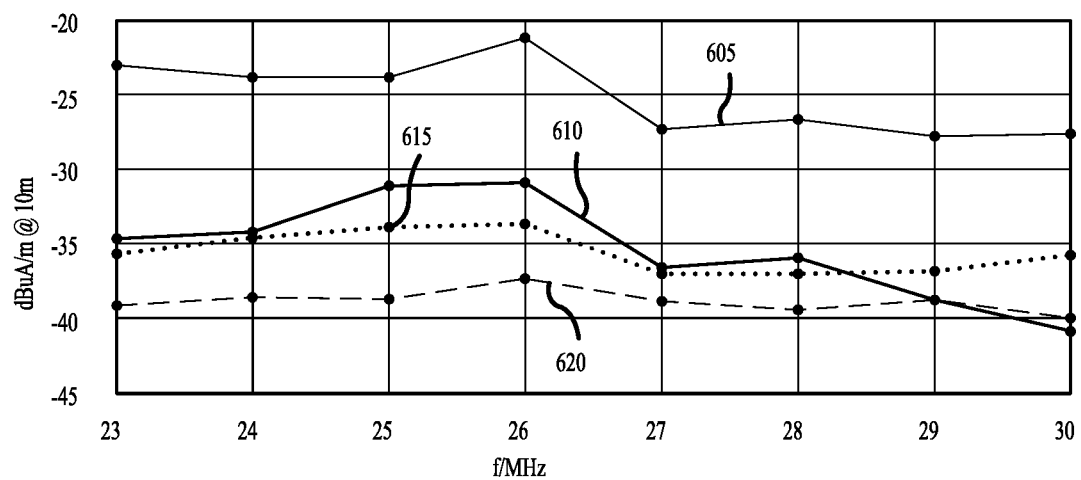
FIG. 6A shows a chart of emissions effects at a first coil position for exemplary shields according to some embodiments of the present technology.
Figure 6B:
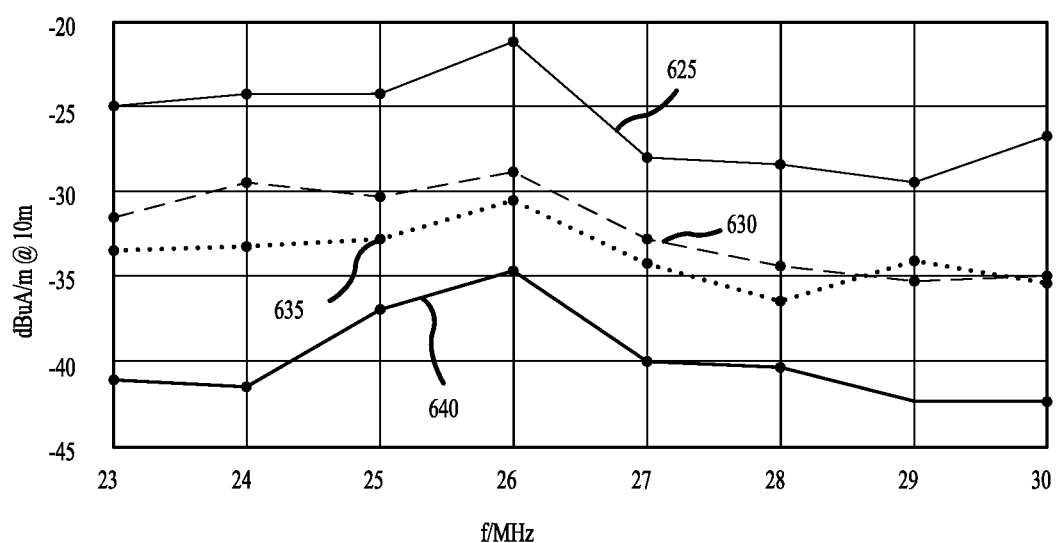
FIG. 6B shows a chart of emissions effects at a second coil position for exemplary shields according to some embodiments of the present technology.

FIGS. 6A and 6B show charts of emissions effects at a first coil position and a second coil position for exemplary shields according to some embodiments of the present technology. For example, FIG. 6A may illustrate the effects of various designs on a first coil in a top layer of coils on one side of the wireless power transmitting device, and FIG. 6B may illustrate the effects of various designs on a second coil in a top layer of coils on the opposite side of the wireless power transmitting device. Line 605 shows the magnitude of the emissions of the first coil at different frequencies without any shield incorporated, and line 625 shows the magnitude of the emissions of the second coil at different frequencies without any shield incorporated.

Line 610 shows the magnitude of emissions of the first coil at different frequencies utilizing a shield structure similar to the configuration illustrated in FIG. 4. As shown, the emissions at 30 MHz has been greatly reduced, and may limit issues with device operation. The emissions at 25 MHz has been partly reduced, although such a reduction may be sufficient for operations performed closer to 30 MHz. Line 640 illustrates the magnitude of emissions of the second coil at different frequencies utilizing the shield structure similar to the configuration illustrated in FIG. 4. As shown, this shield configuration outperformed other shield structures at the second coil.

Line 620 shows the magnitude of emissions of the first coil at different frequencies utilizing a shield structure similar to the configuration illustrated in FIG. 5A. As shown, the emissions at 30 MHz and 25 MHZ has been greatly reduced, and the configuration outperformed other shield structures at the first coil. Line 630 illustrates the magnitude of emissions of the second coil at different frequencies utilizing the shield structure similar to the configuration illustrated in FIG. 5A. As shown, this shield configuration reduced emissions at each frequency, although the extent of reduction was less than other shield structures, and overall, the performance of the shield structure may not improve on other configurations.

Line 615 shows the magnitude of emissions of the first coil at different frequencies utilizing a shield structure similar to the configuration illustrated in FIG. 5B. As shown, the emissions have been reduced at all frequencies, and is an improvement over the configuration of FIG. 4 at lower frequencies, although not at 30 MHz. Line 635 illustrates the magnitude of emissions of the second coil at different frequencies utilizing the shield structure similar to the configuration illustrated in FIG. 5B. As shown, this shield configuration reduced emissions at each frequency, and is an improvement over the configuration of FIG. 5A at most frequencies, although comparable closer to 30 MHz.

The charts of FIGS. 6A and 6B are intended to illustrate that although certain configurations and appendage designs may improve performance at certain coil locations, alternative designs may provide more benefit at other coil locations. Accordingly, depending on device operation frequencies, coil configurations, and shield appendage configurations, an overall profile may be developed for devices to provide emissions reductions at a system level that affords an amount of benefit for performance against different emission requirements, and to accommodate different requirements, different configurations or modifications may be incorporated. By utilizing shields according to the present technology, field emissions of wireless power transmitting devices may be reduced and device performance and efficiency may be improved.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included. Where multiple values are provided in a list, any range encompassing or based on any of those values is similarly specifically disclosed.

As used herein and in the appended claims, the singular forms "a", "an", and "the" include plural references unless the context clearly dictates otherwise. Thus, for example, reference to "a material" includes a plurality of such materials, and reference to "the coil" includes reference to one or more cells and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:

1. A wireless power transmitting device, comprising:
   a contact surface configured to support one or more wireless power receiving devices;
   a plurality of coils; and
   a shield positioned between the plurality of coils and the contact surface, wherein the shield comprises a plurality of shield members, each shield member axially aligned with a separate coil of the plurality of coils, wherein the shield comprises a conductive chassis extending about a perimeter of the shield, and wherein each shield member is electrically coupled with another shield member with a bridge or is electrically coupled with the conductive chassis with a conductive drain.

2. The wireless power transmitting device of claim 1, wherein the shield comprises a conductive sheet spanning an internal area defined by the conductive chassis.

3. The wireless power transmitting device of claim 2, wherein the conductive sheet comprises a first material, wherein the one or more shield members comprise a second material, and wherein the conductive sheet is characterized by a higher sheet resistance than the shield members.

4. The wireless power transmitting device of claim 1, wherein the conductive drain is characterized by an arcuate shape, wherein the conductive drain is positioned between the at least one shield member and the conductive chassis, and wherein the conductive drain is shaped and positioned to limit overlap with an underlying coil relative to a straight-member conductive drain.

5. The wireless power transmitting device of claim 1, wherein each coil of the plurality of coils is characterized by a substantially annular shape, and wherein each shield member of the one or more shield members comprises a body characterized by a substantially annular shape.

6. The wireless power transmitting device of claim 5, wherein each shield member of the one or more shield members defines a gap extending from an inner annular edge of the body to an outer annular edge of the body, and wherein the gap forms a discontinuity about a circumference of each shield member.

7. The wireless power transmitting device of claim 6, wherein each shield member further defines a plurality of slots extending from the inner annular edge of the body towards the outer annular edge of the body.

8. The wireless power transmitting device of claim 5, wherein each shield member of the one or more shield members comprises a grounding pin extending from an inner annular edge of the body and electrically coupling the shield member with a ground of the wireless power transmitting device.

9. A wireless power transmitting device, comprising:
- a contact surface configured to support one or more wireless power receiving devices;
- a first layer of coils distributed in a first planar arrangement;
- a second layer of coils vertically offset from the first layer of coils and positioned between the contact surface and the first layer of coils, the second layer of coils distributed in a second planar arrangement whereby coils of the second layer of coils are laterally offset from coils of the first planar arrangement; and
- a shield positioned between the second layer of coils and the contact surface, wherein the shield comprises a shield member overlying and aligned with a coil of the second layer of coils, wherein the shield comprises a conductive chassis extending about a perimeter of the shield, wherein the shield comprises a plurality of shield members, and wherein each shield member is electrically coupled with another shield member with a bridge or is electrically coupled with the conductive chassis with a conductive drain.

10. The wireless power transmitting device of claim 9, wherein the shield comprises a conductive sheet spanning an internal area defined by the conductive chassis.

11. The wireless power transmitting device of claim 10, wherein the conductive sheet comprises silver, and wherein the shield member comprises copper.

12. A wireless power transmitting device, comprising:
- a contact surface configured to support one or more wireless power receiving devices;
- a plurality of coils; and
- a shield positioned between the plurality of coils and the contact surface, wherein the shield comprises:
  - a conductive chassis,
  - a conductive sheet extending across an internal area defined by the conductive chassis, wherein the conductive sheet comprises a first material, and
  - a shield member positioned on the conductive sheet and overlying a coil of the plurality of coils, wherein the shield member comprises a second material, and wherein the conductive sheet is characterized by a higher sheet resistance than the shield member.

13. The wireless power transmitting device of claim 12, wherein the shield comprises a plurality of shield members, and wherein each shield member is electrically coupled with another shield member with a bridge or is electrically coupled with the conductive chassis with a conductive drain.

14. The wireless power transmitting device of claim 13, wherein each coil of the plurality of coils is characterized by a substantially annular shape, and wherein each shield member of the plurality of shield members comprises a body characterized by a substantially annular shape.

15. The wireless power transmitting device of claim 14, wherein each shield member of the plurality of shield members defines a gap extending from an inner annular edge of the body to an outer annular edge of the body, and wherein the gap forms a discontinuity about a circumference of each shield member body.

* * * * *